(12) United States Patent
Cui et al.

(10) Patent No.: US 10,745,877 B2
(45) Date of Patent: Aug. 18, 2020

(54) TYPHOON-RESISTANT FLOATING BREAKWATER SYSTEM AND CONTROL METHOD THEREOF

(71) Applicant: JIANGSU UNIVERSITY OF SCIENCE AND TECHNOLOGY, Zhenjiang (CN)

(72) Inventors: Jie Cui, Zhenjiang (CN); Zichao Li, Zhenjiang (CN); Chunyan Ji, Zhenjiang (CN); Taoran Zhou, Zhenjiang (CN); Jianting Guo, Zhenjiang (CN)

(73) Assignee: JIANGSU UNIVERSITY OF SCIENCE AND TECHNOLOGY, Zhenjiang (CN)

( * ) Notice: Subject to any disclaimer, the term of this patent is extended or adjusted under 35 U.S.C. 154(b) by 0 days.

(21) Appl. No.: 16/362,578

(22) Filed: Mar. 22, 2019

(65) Prior Publication Data
US 2019/0218735 A1    Jul. 18, 2019

(51) Int. Cl.
*E02B 3/06* (2006.01)
*H02J 7/35* (2006.01)
*B63B 35/44* (2006.01)
*B63B 22/12* (2006.01)

(52) U.S. Cl.
CPC .............. *E02B 3/062* (2013.01); *B63B 22/12* (2013.01); *B63B 35/44* (2013.01); *B63B 2035/4453* (2013.01)

(58) Field of Classification Search
CPC . E02B 3/062; E02B 8/06; B63B 22/12; B63B 35/44; B63B 2035/4453; G05B 19/418; H02J 7/35
See application file for complete search history.

(56) References Cited

U.S. PATENT DOCUMENTS

| | | | | |
|---|---|---|---|---|
| 4,228,360 A | * | 10/1980 | Navarro | F03B 13/1885 290/43 |
| 4,319,454 A | * | 3/1982 | Lucia | F03B 13/1815 417/332 |
| 4,365,576 A | * | 12/1982 | Cook | B63B 35/44 114/257 |
| 4,408,455 A | * | 10/1983 | Montgomery | F03B 13/1815 60/497 |

(Continued)

*Primary Examiner* — Benjamin F Fiorello
*Assistant Examiner* — Edwin J Toledo-Duran
(74) *Attorney, Agent, or Firm* — CBM Patent Consulting, LLC (57) ABSTRACT

A water-surface wave-absorbing structure comprises an equipment cabin and an airbag cabin vertically mounted below the equipment cabin; a solar cell module and an energy storage device in the equipment cabin are mounted on an upper surface of the equipment cabin, a signal transceiver is mounted on top portions of the solar cell module and the energy storage device, a central air distributing device is mounted in the equipment cabin, two ends of the central air distributing device are respectively connected to an air compressor and an air storage tank through vent pipelines, and a central controller is arranged in the central air distributing device and sends control instructions to the central air distributing device and the air compressor; and the airbag cabin comprises a plurality of airbag units, each airbag unit is provided with a plurality of mutually independent air chambers.

6 Claims, 7 Drawing Sheets

(56) References Cited

U.S. PATENT DOCUMENTS

| | | | |
|---|---|---|---|
| 4,551,980 A * | 11/1985 | Bronicki | F01K 13/02 60/698 |
| 5,066,867 A * | 11/1991 | Shim | F03B 13/1885 290/53 |
| 5,311,064 A * | 5/1994 | Kumbatovic | F03B 13/1835 290/42 |
| 5,493,155 A * | 2/1996 | Okamoto | H02J 7/35 307/45 |
| 6,099,368 A * | 8/2000 | Gorshkov | B63H 19/02 440/13 |
| 6,299,965 B1 * | 10/2001 | Keshavaraj | B29C 66/439 139/389 |
| 6,561,856 B1 * | 5/2003 | Gorshkov | B63H 19/02 440/13 |
| 7,808,120 B2 * | 10/2010 | Smith | F03B 13/1815 290/42 |
| 8,035,243 B1 * | 10/2011 | Mesa | F03B 13/1815 290/42 |
| 8,359,855 B1 * | 1/2013 | Fagan | F03B 13/20 290/42 |
| 8,618,686 B2 * | 12/2013 | Jo | F03B 13/20 290/53 |
| 8,937,396 B2 * | 1/2015 | Findlay | F03B 13/1815 290/53 |
| 9,505,469 B2 * | 11/2016 | Valtanen | B65D 90/12 |
| 9,709,142 B2 * | 7/2017 | Maramara | F16H 35/00 |
| 10,442,506 B2 * | 10/2019 | Zhou | B63B 35/44 |
| 2004/0134190 A1 * | 7/2004 | Kanki | F03B 13/20 60/398 |
| 2007/0048086 A1 * | 3/2007 | Thorsbakken | F03B 17/061 405/75 |
| 2010/0074686 A1 * | 3/2010 | Towley, III | F03D 9/255 405/26 |
| 2011/0115229 A1 * | 5/2011 | Rourke | F03B 13/20 290/53 |
| 2012/0153627 A1 * | 6/2012 | Jo | F03B 13/20 290/53 |
| 2014/0020613 A1 * | 1/2014 | Woo | H02S 20/00 114/230.13 |
| 2015/0337759 A1 * | 11/2015 | Lehmann | F02B 63/04 290/2 |
| 2016/0083052 A1 * | 3/2016 | Valtanen | B63B 35/34 114/256 |
| 2016/0083054 A1 * | 3/2016 | Valtanen | B65D 90/12 701/21 |
| 2017/0223867 A1 * | 8/2017 | Magcale | B63B 35/44 |
| 2017/0233966 A1 * | 8/2017 | Ben Eliyahu | E02B 15/0857 405/60 |
| 2017/0284359 A1 * | 10/2017 | Burkle | F03B 13/12 |

\* cited by examiner

TYPHOON-RESISTANT FLOATING BREAKWATER SYSTEM AND CONTROL METHOD THEREOF

TECHNICAL FIELD

The present invention belongs to breakwater technologies, and more particularly, relates to a typhoon-resistant floating breakwater system and a control method thereof.

BACKGROUND

As a hydraulic structure to protect the safety of offshore structures such as a port, a breakwater has experienced a development process from a fixed breakwater to a floating breakwater. Compared with the fixed breakwater, the floating breakwater has the following advantages: (1) the floating breakwater is less affected by water depth and topography, and has a larger application range; (2) a construction cost of the floating breakwater is lower than that of the fixed breakwater; and (3) since the floating breakwater does not hinder the flow of seawater, the seawater exchange capacity thereof is strong and does not affect the marine environment.

However, the floating breakwater also has the following disadvantages: the floating breakwater has higher requirements on the design of a mooring system, especially in severe sea conditions, the floating breakwater is very likely to cause problems such as mooring system failure and mutual collision damage of water-surface wave-absorbing units under over-limit sea conditions, which will eventually lead to damage or sinking of the floating breakwater, thereby weakening or losing the operation efficiency thereof.

SUMMARY

Object of the present invention: the present invention is intended to solve the defects in the prior art and provide a typhoon-resistant floating breakwater system and a control method thereof.

Technical solutions: a typhoon-resistant floating breakwater system according to the present invention comprises a water-surface wave-absorbing structure and a corresponding airbag unit, wherein the water-surface wave-absorbing structure comprises an equipment cabin and an airbag cabin vertically mounted below the equipment cabin; the equipment cabin comprises a signal transceiver, a solar cell module and an energy storage device, a central controller, a central air distributing device, an air compressor and a plurality of air storage tanks, the solar cell module and the energy storage device are mounted on an upper surface of the equipment cabin, the signal transceiver is mounted on top portions of the solar cell module and the energy storage device, the central air distributing device is mounted in the equipment cabin, two ends of the central air distributing device are respectively connected to an air compressor and an air storage tank through vent pipelines, and the central controller is arranged in the central air distributing device and sends control instructions to the central air distributing device and the air compressor; and the airbag cabin comprises a plurality of airbag units, each airbag unit is provided with a plurality of mutually independent air chambers, each independent air chamber is provided with a corresponding airbag interface, and is communicated with the vent pipeline through the airbag interface, so as to be connected to the air storage tank.

That is, the floating and diving of the water-surface wave-absorbing structure unit are changed through inflating and deflating the airbag units, so as to guarantee the safety of the floating breakwater under an over-limit working condition.

Further, the central controller controls operations of the air compressor and the central air distributing device according to data information of the signal transceiver, so as to control inflation and deflation of each airbag to realize floating and diving of the airbag cabin.

Further, a main structure of the water-surface wave-absorbing structure is made of steel, and the solar cell module and the energy storage device are designed integrally. Steel structures of different configurations reflect wave-absorbing characteristics of corresponding water-surface wave-absorbing units, which can be either a typical floating breakwater configuration (e.g. a single square box type) or an atypical floating breakwater configuration (e.g. a double square box type, a net box type, a cylinder type, etc.), and the specific configuration is based on actual engineering application. For example, the present invention adopts a typical square floating breakwater configuration.

Further, the airbag cabin is provided with a plurality of airbag units, all the airbag units are evenly arranged in upper and lower layers, each airbag unit comprises eight independent air chambers, and the independent air chambers are arranged in two layers and in pairs; and each independent air chamber comprises an upper layer and a lower layer, which are sequentially an upper air chamber and a lower air chamber, top portions of the upper air chamber and the lower air chamber are respectively provided with an upper airbag interface and a lower airbag interface, each upper airbag interface and each lower airbag interface are respectively connected by a vent pipeline, an air valve assembly is arranged at a connected portion of the vent pipelines, and the air valve assembly comprises an air outlet electromagnetic valve and an air inlet electromagnetic valve.

Moreover, in order to prevent each independent air chamber from falling off in a deflated state, a cross brace is arranged below the chamber.

Further, the central air distributing device is also provided with an air outlet electromagnetic valve.

The present invention further discloses a control method of the typhoon-resistant floating breakwater system, wherein the solar cell module converts solar energy into electric energy in real time, the energy storage device stores the converted electric energy in time, and the solar cell module and the energy storage device supply power for the whole system; the signal transceiver periodically receives and transmits information relating working condition, and the central control device judges whether an over-limit working condition occurs according to data signals of the signal transceiver: if the over-limit working condition occurs, an emergency deflation device is controlled to start working, each independent air chamber starts deflating, a buoyancy of the whole airbag cabin is reduced, the breakwater system gradually sinks, and when the breakwater system sinks to a predetermined water depth, the over-limit working condition is avoided; and if detecting that the over-limit working condition is ended, the central control device controls the air compressor and the air storage tank to start working to inflate the corresponding independent air chamber, and the breakwater system generates buoyancy and starts floating until the breakwater system rises to a sea level.

Further, the central controller judges a pressure level in the corresponding air storage tank through real-time detection data of each pressure sensor, and if a current pressure of the air storage tank is too small, the central controller controls the air compressor to inflate the air storage tank;

when the air in the air storage tank is insufficient, the air compressor inflates the corresponding air storage tank; and the pressure sensors are respectively mounted in the corresponding airbag interfaces.

A power output of the solar cell module above should meet the energy consumption requirements of the whole system. Specific energy consumption shall be subject to actual engineering application. The energy storage device can avoid system operation difficulty caused by weather and other reasons, and meet the energy consumption requirements for the normal operation of the wind and wave resistance system, comprising the energy consumption requirements for the water-surface wave-absorbing unit to dive from the standard draft to a predetermined depth and the water-surface wave-absorbing unit to float from the underwater to the standard draft in an emergency state.

Beneficial effects: according to the present invention, the floating and diving of the water-surface wave-absorbing structure unit are changed through inflating and deflating the airbag units, so as to guarantee the safety of the floating breakwater under an over-limit working condition, which can effectively improve the safety of the floating breakwater under the over-limit working condition, and prevent the breakwater from colliding a shielded structure after being damaged under the ultra-limit working condition.

DETAILED DESCRIPTION

The technical solutions of the present invention are described in details hereinafter, but the protection scope of the present invention is not limited to the described embodiments.

Figure 1A:
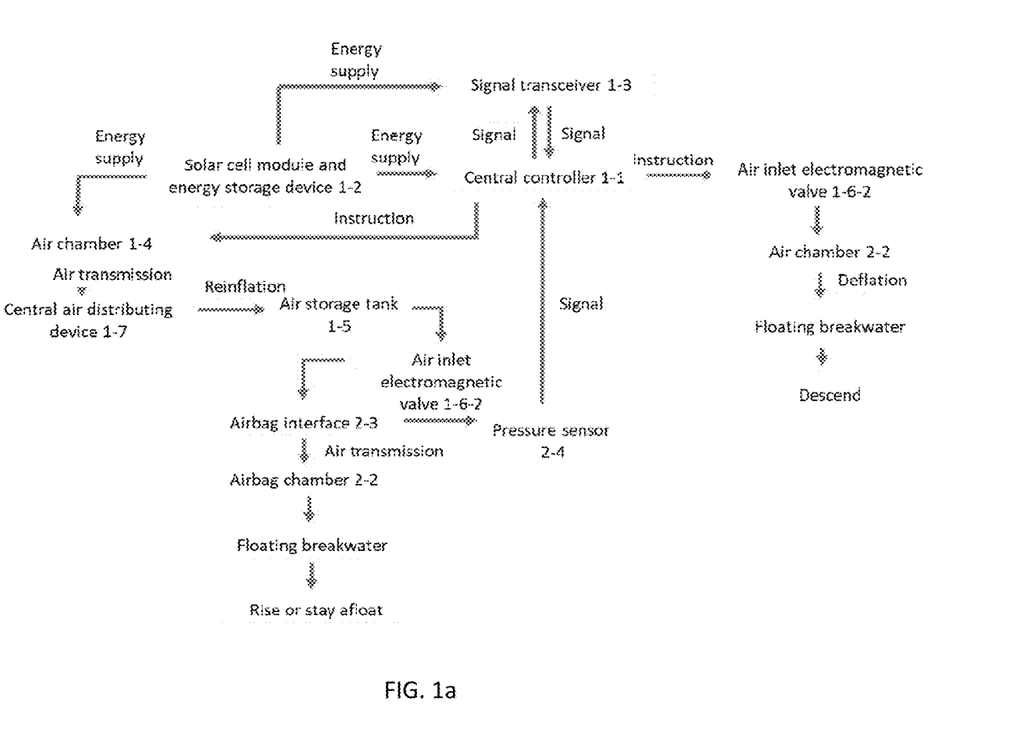
FIG. 1a is a control logic diagram of the present invention, an overall control diagram.
Figure 1B:
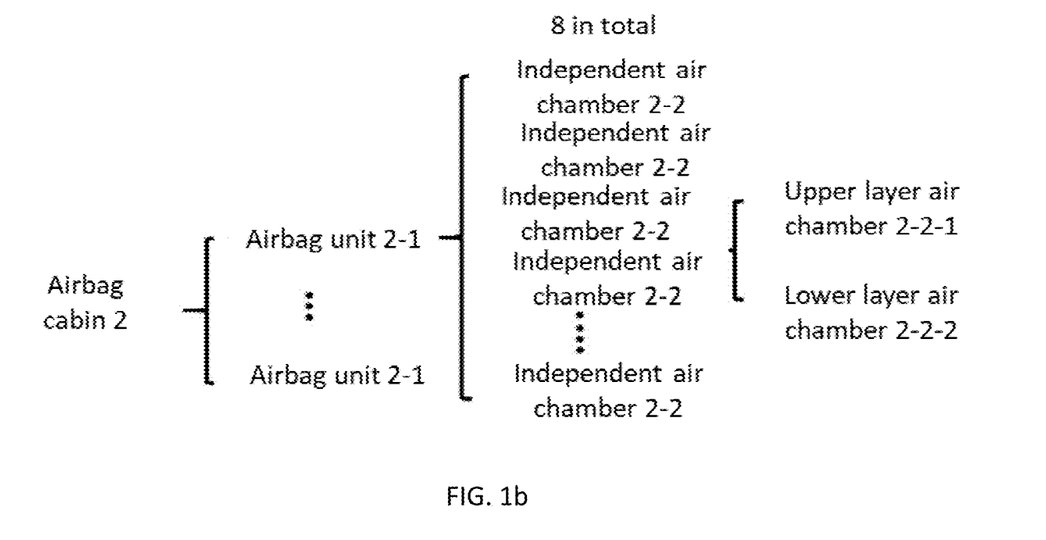
FIG. 1b is a control logic diagram of the present invention, a structure diagram of the airbag cabin.
Figure 2:
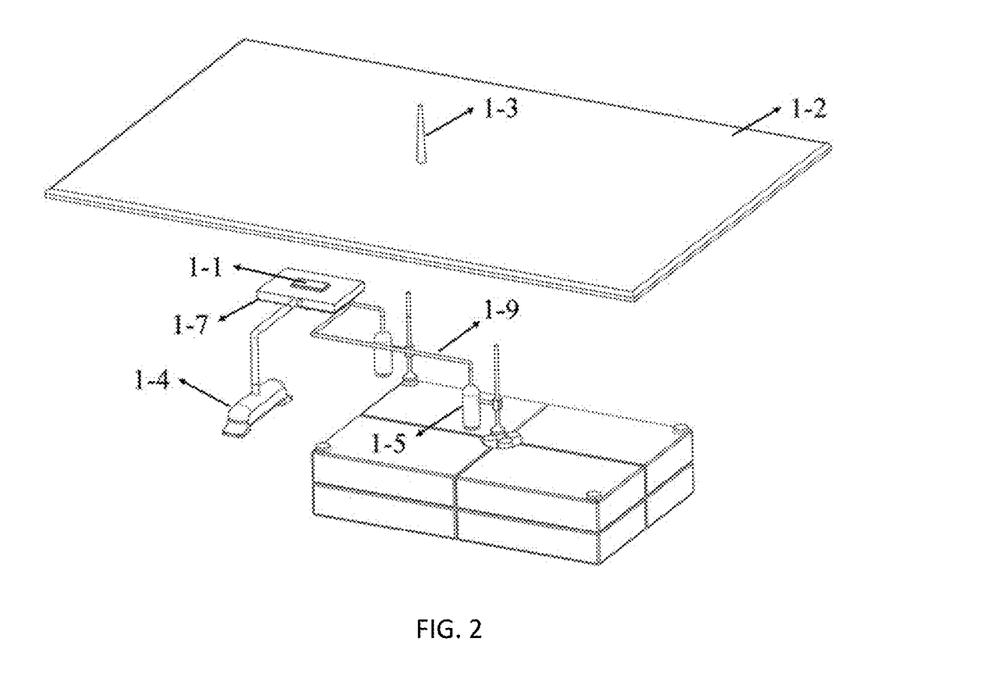
FIG. 2 is a structure diagram of a system of the present invention.

As shown in FIG. 1, a typhoon-resistant floating breakwater system of the present invention comprises a water-surface wave-absorbing structure and a corresponding airbag unit, wherein the water-surface wave-absorbing structure comprises an equipment cabin 1 and an airbag cabin 2 vertically mounted below the equipment cabin 1; the equipment cabin 1 comprises a signal transceiver 1-3, a solar cell module and an energy storage device 1-2, a central controller 1-1, a central air distributing device 1-7, an air compressor 1-4 and an air storage tank 1-5, the solar cell module and the energy storage device 1-2 are mounted on an upper surface of the equipment cabin 1, the signal transceiver 1-3 is mounted on a top portion of the solar cell module and the energy storage device 1-2, the central air distributing device 1-7 is mounted in the equipment cabin 1, two ends of the central air distributing device 1-7 are respectively connected to an air compressor 1-4 and an air storage tank 1-5 through vent pipelines 1-9, and the central controller 1-1 is arranged in the central air distributing device 1-7 and sends control instructions to the central air distributing device 1-7 and the air compressor 1-4; and the airbag cabin 2 comprises a plurality of airbag units 2-1, each airbag unit 2-1 is provided with a plurality of mutually independent air chambers 2-2, and each independent air chamber 2-2 is provided with a corresponding airbag interface 2-3, and is communicated with the vent pipeline 1-9 through the airbag interface 2-3, so as to be connected to the air storage tank 1-5.

That is, the floating and diving of the water-surface wave-absorbing structure unit are changed through inflating and deflating the airbag units 2-1, so as to guarantee the safety of the floating breakwater under an over-limit working condition.

The central controller 1-1 controls the operation of the air compressor 1-4 and the central air distributing device 1-7 according to data information of the signal transceiver 1-3, so as to control the inflation and deflation of each airbag to realize the floating and diving of the airbag cabin 3. The signal transceiver 1-3 regularly receives instructions such as environmental meteorological information and human control uploaded by a data center, and at the same time, the signal transceiver 1-3 can also regularly send an overall working state of a wind and wave resistance system to the data center. Through the data center of the signal transceiver 1-3, information such as the working state of the water-surface wave-absorbing structure unit can be grasped in real time. At the same time, the data center can also send out operations of diving and avoiding the danger to the water-surface wave-absorbing structure unit according to meteorological information.

A main structure of the water-surface wave-absorbing structure is made of steel, and the solar cell module and the energy storage device 1-2 are designed integrally. Steel structures of different configurations reflect wave-absorbing characteristics of corresponding water-surface wave-absorbing units, which can be either a typical floating breakwater configuration (e.g. a single square box type) or an atypical floating breakwater configuration (e.g. a double square box type, a net box type, a cylinder type, etc.), and the specific configuration is based on actual engineering application. For example, the present invention adopts a typical square floating breakwater configuration.

Figure 6:
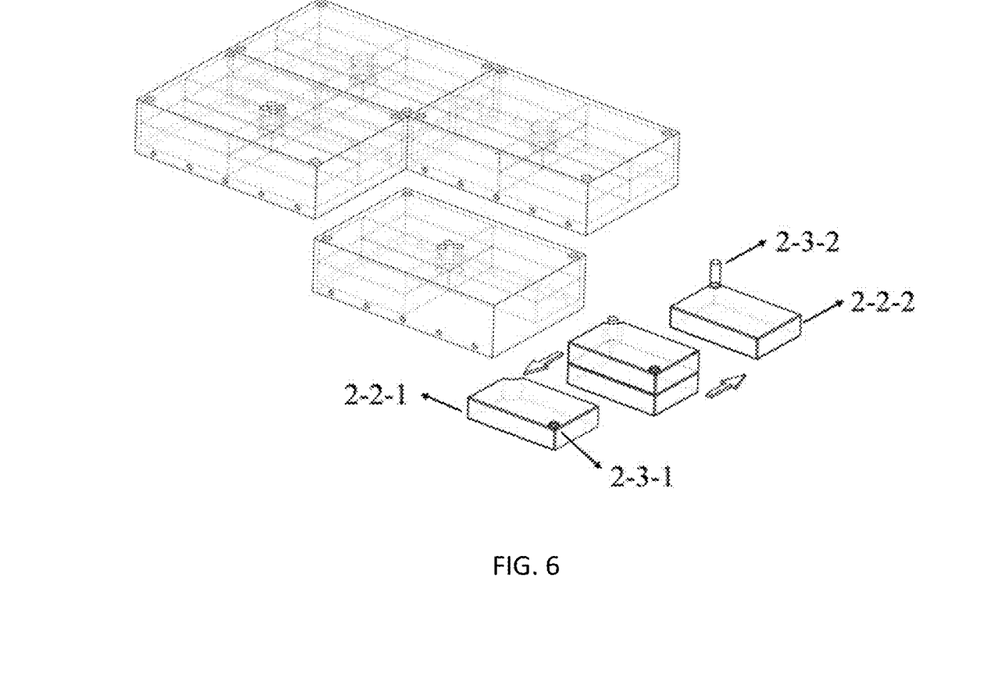
FIG. 6 is a diagram of the airbag cabin of a floating breakwater of the present invention.
Figure 11:
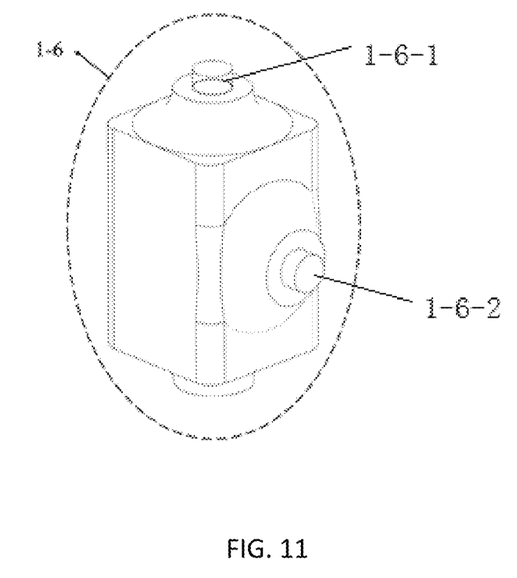
FIG. 11 is a diagram of the air valve assembly of the present invention.

In the embodiment, the airbag cabin 2 is provided with a plurality of airbag units 2-1 in total, all the airbag units 2-1 are evenly arranged in upper and lower layers, each airbag unit 2-1 comprises eight independent air chambers 2-2, and the independent air chambers 2-2 are arranged in two layers and in pairs; and each independent air chamber 2-2 comprises an upper layer and a lower layer, which are sequentially an upper air chamber 2-2-1 and a lower air chamber 2-2-2, top portions of the upper air chamber 2-2-1 and the lower air chamber 2-2-2 are respectively provided with an upper airbag interface 2-3-1 and a lower airbag interface 2-3-2, each upper airbag interface 2-3-1 and each lower airbag interface 2-3-2 are respectively connected by a vent pipeline 1-9, an air valve assembly 1-6 is arranged at a connected portion of the vent pipelines 1-9, and the air valve assembly 1-6 comprises an air outlet electromagnetic valve 1-6-1 and an air inlet electromagnetic valve 1-6-2. The central air distributing device 1-7 is also provided with an air outlet electromagnetic valve.

Figure 12:
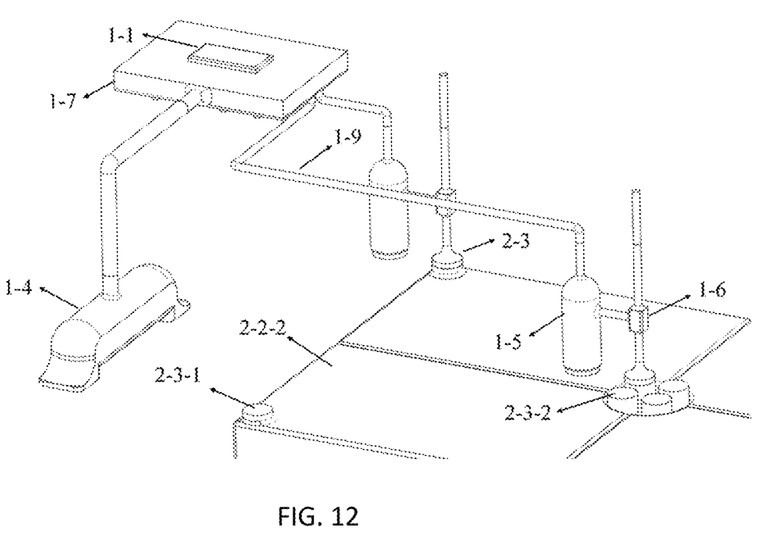
FIG. 12 is a partial detail diagram of the present invention.

Moreover, in order to prevent each independent air chamber 2-2 from falling off in a deflated state, a cross brace 1-8 is arranged below the chamber.

Figure 3:
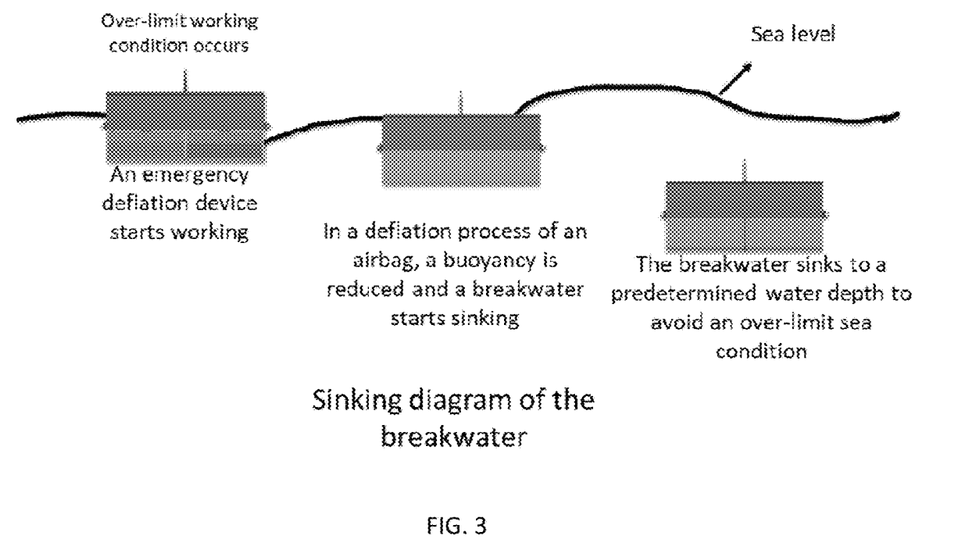
FIG. 3 is a diagram illustrating diving of a water-surface wave-absorbing unit of the present invention.
Figure 4:
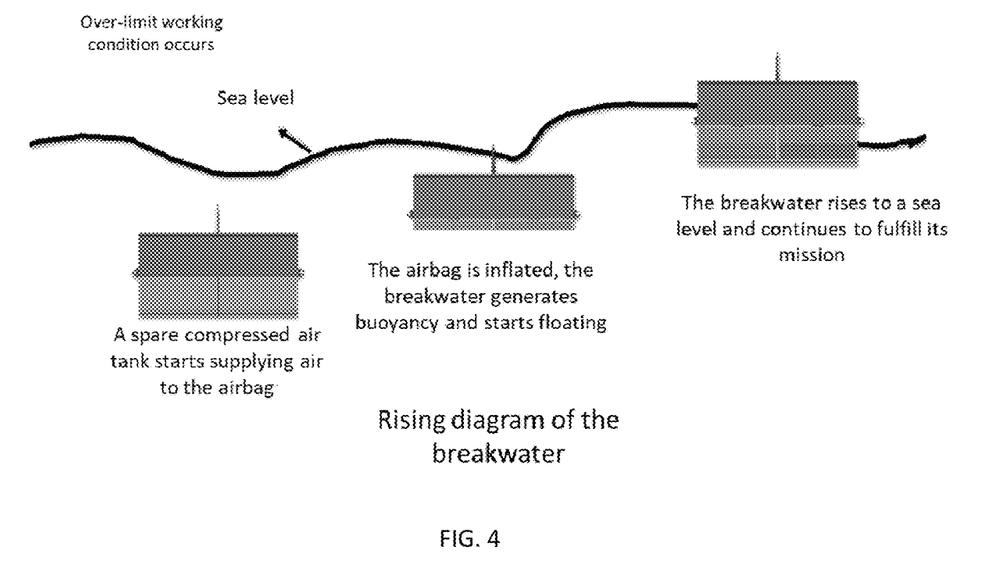
FIG. 4 is a diagram illustrating floating of the water-surface wave-absorbing unit of the present invention.
Figure 5:
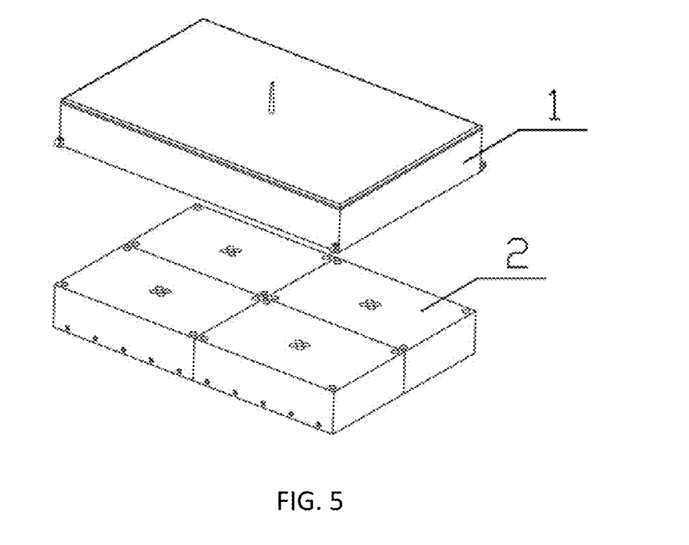
FIG. 5 is a functional partition diagram of an equipment cabin and an airbag cabin in the present invention.

For a control method of the typhoon-resistant floating breakwater system above, the solar cell module converts solar energy into electric energy in real time, the energy storage device 1-2 stores the converted electric energy in time, and the solar cell module and the energy storage device 1-2 supply power for the whole system; the signal transceiver 1-3 periodically receives and transmits information relating working condition, and the central control device judges whether an over-limit working condition occurs according to data signals of the signal transceiver 1-3: if the over-limit working condition occurs, an emergency deflation device is controlled to start working, each independent air chamber 2-2 starts deflating, a buoyancy of the whole airbag cabin 2 is reduced, the breakwater system gradually sinks, and when the breakwater system sinks to a predetermined water depth, the over-limit working condition is avoided; and if detecting that the over-limit working condition is ended, the central control device controls the air compressor 1-4 and the air storage tank 1-5 to start working to inflate the corresponding independent air chamber 2-2, and the breakwater system generates buoyancy and starts floating until the breakwater system rises to a sea level.

Figure 10:
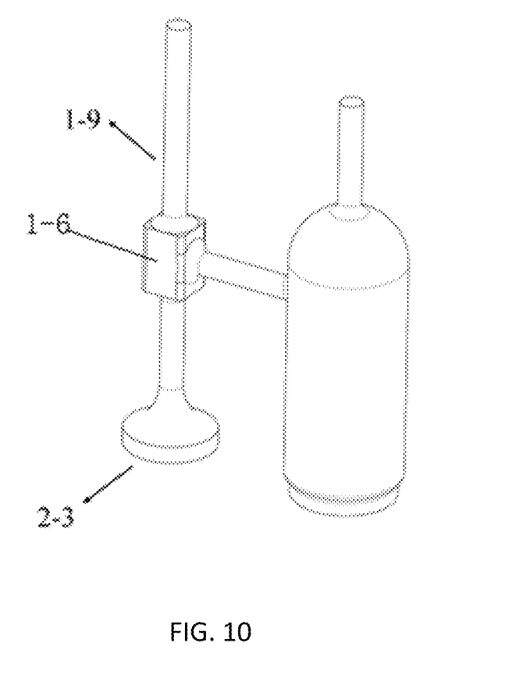
FIG. 10 is a diagram illustrating connection between an air valve assembly and a spare compressed air tank pipeline.

In the process above, the air valve assembly 1-6 completes the following works: (1) the air outlet electromagnetic valve 1-6-1 is opened to perform emergency deflation on each airbag unit 2-1 under the over-limit working condition, so that the water-surface wave-absorbing structure unit completes the diving operation, and the air is discharged through the vent pipeline 1-9; (2) when the air storage tank 1-5 needs to be supplied with air, the air outlet electromagnetic valve 1-6-2 is opened to complete the air supply operation through the cooperation with the central air distributing device 1-7, and the air supply is inflated through the vent pipeline 1-9; and (3) when the water-surface wave-absorbing unit floats upwardly, the air inlet electromagnetic valve is opened to inflate the corresponding independent air chamber 2-2, and similarly, the air supply is inflated through the vent pipeline 1-9.

Figure 7:
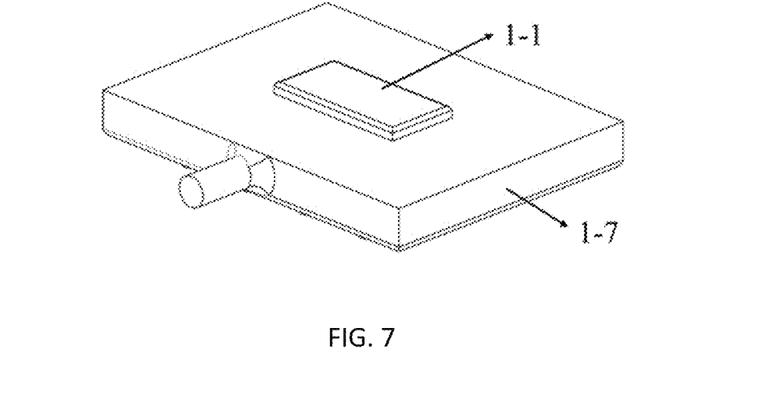
FIG. 7 is a structure diagram of a central controller and a central air distributing device of the present invention.
Figure 8:
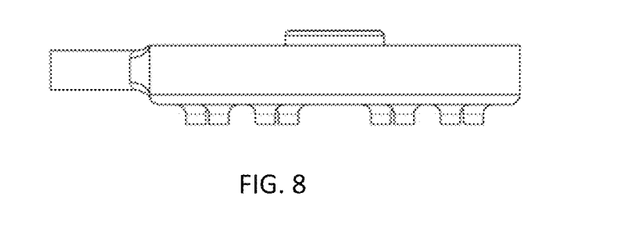
FIG. 8 is a top view of the central controller and the central air distributing device of the present invention.
Figure 9:
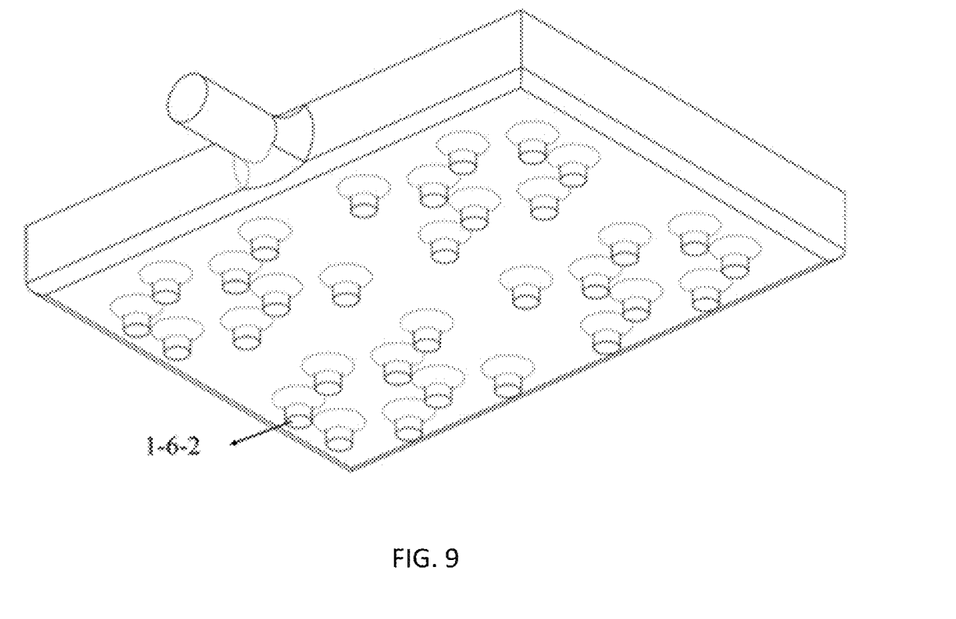
FIG. 9 is a bottom view of the central controller and the central air distributing device of the present invention.

The central controller 1-1 in the embodiment judges a pressure level in the corresponding air storage tank 1-5 through real-time detection data of each pressure sensor; and when the air in the air storage tank 1-5 is insufficient, the air compressor 1-4 inflates the corresponding air storage tank 1-5. Moreover, the central air distributing device 1-7 can independently control the air distribution of each independent air chamber 2-2, each air storage tank 1-5 can also meet the air capacity requirements of a single independent air chamber 2-2, and the number of the air storage tanks 1-5 is determined and distributed according to specific working conditions.

All information flows of the whole system are transmitted to the central controller 1-1 through lines for logical analysis and comparison of the system; and at the same time, the central controller 1-1 can also send out various instructions such as control to the whole wind and wave resistance system through the lines. Through a preset system program, the central controller 1-1 can complete the automatic operation of the whole wind and wave resistance system and reduce the cost on manual control; and at the same time, in order to guarantee the safety and redundancy of the system, the central controller 1-1 can also accept manual control instruction.

A power output of the solar cell module above shall meet the energy consumption requirements of the whole system. Specific energy consumption shall be subject to actual engineering application. The energy storage device 1-2 can avoid system operation difficulty caused by weather and other reasons, and meet the energy consumption requirements for the normal operation of the wind and wave resistance system, comprising the energy consumption requirements for the water-surface wave-absorbing unit to dive from the standard draft to a predetermined depth and the water-surface wave-absorbing unit to float from the underwater to the standard draft in an emergency state.

To sum up, the floating breakwater can be integrally dived and floated in manual control or automatic program control mode, and safety problems such as the damage or sinking of the floating breakwater and even the collision with protected structure can be avoided under over-limit working condition.

What is claimed is:

1. A typhoon-resistant floating breakwater system, comprising a water-surface wave-absorbing structure and an airbag cabin, wherein the water-surface wave-absorbing structure comprises an equipment cabin and the airbag cabin vertically mounted below the equipment cabin;

the equipment cabin comprises a signal transceiver, a solar cell module and an energy storage device, a central controller, a central air distributing device, an air compressor and a plurality of air storage tanks, the solar cell module and the energy storage device are mounted on an upper surface of the equipment cabin, the signal transceiver is mounted on top portions of the solar cell module and the energy storage device, the central air distributing device is mounted in the equipment cabin, two ends of the central air distributing device are respectively connected to the air compressor and one of the air storage tanks through a vent pipeline, and the central controller is arranged in the central air distributing device and sends control instructions to the central air distributing device and the air compressor; and the airbag cabin comprises a plurality of airbag units, each airbag unit is provided with a plurality of mutually independent air chambers, each independent air chamber is provided with a corresponding airbag interface, and is communicated with the vent pipeline through the airbag interface, so as to be connected to one of the air storage tanks;

wherein the airbag cabin is provided with the plurality of airbag units, all the airbag units are evenly arranged in upper and lower layers, each airbag unit comprises eight independent air chambers, and the independent air chambers are arranged in two layers and in pairs; and each independent air chamber comprises an upper layer and a lower layer, which are sequentially an upper air chamber and a lower air chamber, top portions of the upper air chamber and the lower air chamber are respectively provided with an upper airbag interface and a lower airbag interface, each upper airbag interface and each lower airbag interface are respectively connected by the vent pipeline, an air valve assembly is arranged at a connected portion of the vent pipelines, and the air valve assembly comprises an air outlet electromagnetic valve and an air inlet electromagnetic valve.

2. The typhoon-resistant floating breakwater system according to claim 1, wherein the central controller controls operations of the air compressor and the central air distributing device according to data information of the signal transceiver, so as to control inflation and deflation of each airbag to realize floating and diving of the airbag cabin.

3. The typhoon-resistant floating breakwater system according to claim 1, wherein a main structure of the water-surface wave-absorbing structure is made of steel, and the solar cell module and the energy storage device are designed integrally.

4. The typhoon-resistant floating breakwater system according to claim 1, wherein the central air distributing device is also provided with an air outlet electromagnetic valve.

5. A control method of the typhoon-resistant floating breakwater system according to claim 1, wherein the solar cell module converts solar energy into electric energy in real time, the energy storage device stores the converted electric energy in time, and the solar cell module and the energy storage device supply power for the whole system; the signal transceiver periodically receives and transmits information relating working condition, and the central control device judges whether an over-limit working condition occurs according to data signals of the signal transceiver: if the over-limit working condition occurs, an emergency deflation device is controlled to start working, each independent air chamber starts deflating, a buoyancy of the whole airbag cabin is reduced, the breakwater system gradually sinks, and when the breakwater system sinks to a predetermined water depth, the over-limit working condition is avoided; and if detecting that the over-limit working condition is ended, the central control device controls the air compressor and the air storage tanks to start working to inflate the corresponding independent air chamber, and the breakwater system generates buoyancy and starts floating until the breakwater system rises to a sea level.

6. The control method of the typhoon-resistant floating breakwater system according to claim 5, wherein the central controller judges a pressure level in one of the air storage tanks through real-time detection data of a pressure sensor, and if a current pressure of the one of the air storage tanks is too small, the central controller controls the air compressor to inflate the one of the air storage tanks; when the air in the one of the air storage tanks is insufficient, the air compressor inflates the one of the air storage tanks; and the pressure sensors are respectively mounted in the corresponding airbag interfaces.

* * * * *